United States Patent [19]

Schwemer

[11] 4,071,604

[45] Jan. 31, 1978

[54] METHOD OF PRODUCING HOMOGENEOUS CARBON AND GRAPHITE BODIES

[75] Inventor: Warren C. Schwemer, Arlington, Tex.

[73] Assignee: Advanced Technology Center, Inc., Grand Prairie, Tex.

[21] Appl. No.: 690,697

[22] Filed: May 27, 1976

Related U.S. Application Data

[63] Continuation-in-part of Ser. No. 529,172, Dec. 3, 1974, abandoned.

[51] Int. Cl.² .................. C01B 31/00; C01B 31/02; C01B 31/04
[52] U.S. Cl. .................................. 423/445; 423/448; 423/449; 264/29.1; 264/29.7
[58] Field of Search .............. 423/448, 449, 445; 264/29.1, 29.7

[56] References Cited

U.S. PATENT DOCUMENTS

| | | | |
|---|---|---|---|
| 3,035,308 | 5/1962 | Ragoss et al. | 264/29 |
| 3,309,437 | 3/1967 | Harnett | 423/448 X |
| 3,387,541 | 1/1974 | Grindstaff et al. | 423/448 X |
| 3,443,900 | 5/1969 | Bregazzi | 423/460 |

*Primary Examiner*—O. R. Vertiz
*Assistant Examiner*—Gregory A. Heller
*Attorney, Agent, or Firm*—Jack A. Kanz; H. C. Goldwire

[57] ABSTRACT

Disclosed are methods of converting organic materials to dense bodies of homogeneous amorphous carbon or graphite. The organic material is converted by pyrolysis to an amorphous plastic carbon precursor which is then comminuted. The plastic carbon precursor particles are pressed into a monolithic body without the use of any binder material and the precursor body converted to carbon or graphite by application of heat at controlled rates.

34 Claims, No Drawings

METHOD OF PRODUCING HOMOGENEOUS CARBON AND GRAPHITE BODIES

This is a continuation-in-part of co-pending application Ser. No. 529,172 entitled METHOD OF PRODUCING HOMOGENEOUS CARBON AND GRAPHITE BODIES filed Dec. 3, 1974 (now abandoned) and assigned to the same assignee.

This invention relates to methods of forming bodies of carbon and bodies of synthetic graphite. More particularly, it relates to methods of converting graphitizable organic materials to dense, homogeneous, monolithic bodies of graphite or carbon.

Synthetic graphite has been used for many years in various applications. To satisfy the need for large quantities of such graphite, various commercial processes have been developed which produce unitary bodies of synthetic graphite in bulk.

It is well known that a wide range of organic materials, natural as well as synthetic, yield solid carbons when heated to about 1000° C and that many of those may be converted to the graphite structure by heating to temperatures in the range of about 2200° C to about 3000° C in a non-oxidizing environment. The normal product of such a process, however, is a highly porous body or powder. Therefore, a conventional carbonized product must be particulated and reformed into an article of desired size and configuration before graphitization to produce the bodies of graphite normally required for industry.

Melting and casting as commonly used for forming metal bodies cannot be used in a practical process for forming graphite bodies since the triple phase point for carbon occurs at about 4020° C and 125 atmospheres. Obviously, other processes must be utilized.

According to a known method of producing carbon and graphite bodies, particles consisting largely of carbon (for example, calcined petroleum coke) are intermixed with a binder (e.g., molasses, coal tar pitch, or other carbon percursor) and formed into a "green body" of desired configuration. The green body then is heated to drive all of the heat-evolvable constitutents therefrom, thus leaving a two-phase carbon body which is made up of particles of carbon from one source (e.g., the calcined coke) bound together with a carbon matrix produced from the binder. By further heating, the carbon body may be converted to a graphite body. The resultant body continues to be a two-phase structure since it consists of graphite particles from one source bound together by graphite from another source.

Such a body has many deficiencies, when compared with the theoretical potential of graphite and carbon and, in the case of graphite, with single crystals and whiskers thereof and with pyrolytic graphite. For convenience in discussion, graphite will be referred to, but it will be understood that most of these deficiencies apply also to a body which remains in the amorphous carbon state. More particularly, the graphite that originally was pitch (or other binder) is highly porous, with the result that its bonds to the coke-originated particles are relatively weak. Further, the binder graphite tends to be of poor resistance to oxidation. While the graphite particles from coke are less porous, stronger, and of better resistance to oxidation, this is of little help to the durability of the body as a whole, for deterioration of the binder graphite under oxidizing conditions and/or subjection to stressing loads results in spalling and/or fracture or other failure of the body. Since such articles are of tensile strengths that are low in comparison with their compressive strengths, they are predisposed to failure under tensile loads; and such failure is attributable to failure of the binder graphite and/or of its bonds to the coke graphite. The ratio of tensile to compressive strength of such a conventional graphite is only about 0.26. In addition, there tends to be a wide variation of pore size and distribution in such graphite bodies which is especially prominent in the binder graphite where the pore size may range from 5 to 300 microns. Because they tend to have unpredictably different rates of thermal expansion along different axes, it is not practically possible to provide them with an oxidation-protective coating of matching coefficient of expansion in all planes. As a consequence, the undesirably early failure of such a coating and the body sought to be protected thereby is common.

According to another known method of making a graphite (or merely carbon) body, uncalcined petroleum coke particles are treated with a plasticizer (coal and wood tar pitches and oils, anthracene oil, heavy lignite tar oils and pitches, aromatic hydrocarbons, etc.) to soften only the surface of each particle in order that, when the particles are forced together in a mold or by being extruded, the particles will adhere together and, to some extent, experience a merging of their softened exterior surfaces. The molded or extruded body is heated until the evolvable components of the plasticizer and raw coke are driven off. The resulting carbon body, where desired, is further heated to convert its components into graphites. Again, the graphite body is of a two-phase character, being made up of graphite from the unplasticized cores of the coke particles and from the matrix formed from coke and plasticizer residues in the plasticized surface portions of the particles. Again, and for the reason already given, the strength and oxidation resistance of the article are undesirably low. These undesirabilities are further increased by incomplete coalescence between the coke particles during molding or extrusion which weaken the green body and make it unable to withstand the stresses caused by temperature changes, gas evolution, and the different shrinkage rates of the plasticized and unplasticized portions of the coke particles during baking. Further, the plasticizing operation must be carried out with much care, for other than optimum plasticizing will result in even less coalescence between the coke particles. Because the amount of plasticizer required varies with the total area of particle surface to be plasticized, the particle size must be closely controlled and must be uniform. The penetration depth of the plasticizing must be closely controlled, for too deep a penetration results in a dryness of the particle surfaces which spoils molding qualities; and the corrective addition of more plasticizer results in a larger quantity of gases that must be driven off in baking and hence in more and/or larger pores, greater baking stresses, longer baking times, etc. For control of penetration depth, the time during which the plasticizer and raw coke are mixed must be carefully controlled, and the partially plasticized raw coke must be molded promptly. Even when plasticizing is carried out at its best, the pressures of molding or extrusion set up stresses in the brittle cores of the coke particles which often result in their fracture; and each fracture provides a region of greater weakness in the finished article. Where these stresses in the solid cores do not cause core fractures, they remain in the cores and hence tend to be relieved and to cause cracking in the green body when molding or extruding pressures are removed. In the carbon and graphite bodies produced by either of the above methods, the relatively high porosity as well as non-uniformity of pore size and crystalline structure by which they are characterized diminishes electrical and thermal conductivities, and the wide variation in pore size and distribution causes non-uniformities of electrical and thermal conductivities, strength, etc., from one given region to another within the body.

Processes have been developed for partially alleviating the inherent porosity of graphite bodies formed in accordance with the methods described above. For example, the density of the final graphite body can be increased by impregnating the carbonized body with a pyrolyzable liquid, such as pitch or the like, and repeating the carbonizing step. In this process the green bodies are formed as above by either the binder and calcined coke method or the uncalcined, partly plasticized coke method. The body is then heated to drive off the evolvable gases and form a porous carbon body. The body is then cooled and molten pitch or similar material forced under pressure into the pores. The impregnated body is then again heated to carbonize the impregnating pitch.

It should be noted, however, that carbonization of the impregnating pitch results in evolution of gas from the impregnation material. Therefore, porosity may be reduced but not eliminated. However, impregnation and carbonization introduces a third source of carbon and hence produces a body of three-phase character. Accordingly, while the body may be more dense, the porosity and particle structure of the body will be less uniform and the final graphite body may be mechanically less stable and possess unpredictable electrical and thermal characteristics.

A further disadvantage of the use of uncalcined, partly plasticized petroleum coke for the manufacture of carbon and graphite bodies is that the characteristics of such cokes vary from manufacturer to manufacturer and even from batch to batch produced by the same facility. Such variations may in part be attributable to differing sources of the oils from which the cokes are made and certainly are influenced by differing refining methods employed in utilizing the oils. Since the coke is merely the residue remaining after the fractions of the crude oil regarded as primarily valuable have been taken off, the refiner must vary his methods from time to time and as necessary for meeting his then-current demands for various petroleum products; and it is not economically feasible to so control the refining process as to produce a coke of uniformly high desirability for carbon manufacture. Consequently, the carbon manufacturer has difficulty finding a dependable source of uniformly usable coke. Furthermore, not all the attributes of a coke good for the above purpose are clearly known, and the most practical, if not only, way of determining if a particular batch of coke (particularly if uncalcined) is satisfactory is the empirical one of trying it.

In both the use of calcined coke with a binder and that of an unclacined coke admixed with a plasticizer, quite large volumes of gases must be driven from the green body. This must be done in a controlled manner in which the temperature is raised in many increments and over long periods ranging from days to weeks or even months. Too rapid an increase in temperature results in evolution of gases at a rate greater than that which can be withstood by the green body, which consequently swells, cracks, etc. Such careful heating over so long a period of time is expensive in terms of equipment, time and energy necessary to effect it and ordinarily is most efficiently accomplished in furnaces used only for carbonizing, the much shorter step of graphitizing being accomplished in still another furnace which must be provided for that specific purpose. The transfer from one furnace to another, however, entails loss of the time required for the cooling of the carbonized body to a temperature at which it can be handled for transfer into the graphitizing furnace. The thermal energy lost in cooling is wasted and must be replaced by the graphitizing furnace. It clearly would be advantageous if the carbonizing step were short enough to make it feasible to accomplish carbonizing and graphitizing in a single furnace and in a continuous operation.

It will be apparent that since volatile materials are evolved during the carbonizing process, the body must physically shrink to maintain structural integrity. Furthermore, since the body is heated by radiation, its outer surface will be hotter than the interior of the body during temperature increasing cycles, the temperature gradient being dependent on the physical size of the body and the rate of increase. Fortunately, unless the rate of shrinkage is large with respect to the rate of temperature increase, the temperature gradients across the body cause the body to be subjected to compressive stresses during heating, aiding in formation of denser bodies. Furthermore, a carbon body has much higher compressive strength than tensile strength. Therefore, fracturing is not likely to be caused from thermal stresses alone when the outer portion of the body is hotter than the core. Conversely, cooling causes tensile stresses in the outer surface since the outer surface cools first. Therefore, cooling the carbon body for transfer to the graphitizing furnace often causes flaking, fractures, etc., in the body. However, if the carbon body were converted directly to graphite without cooling, the thermal stresses encountered during cooling would be less severe because of the higher thermal conductivity and lower modulus of elasticity and thermal expansion of graphite. Moreover, graphite and carbon bodies of improved density, strength, oxidation resistance, capability of being effectively coated for further increase in resistance to oxidation, improved electrical and thermal conductivity characteristics, etc. are to be desired for a number of purposes. A relatively inexpensive, readily available, highly dense graphite will be of great usefulness in graphite-moderated nuclear facilities; for smaller volumes of graphite will be required. That there is room for much improvement in this regard is apparent when it is considered that (with a single known, relatively expensive exception) the best previously obtainable commercial graphites (as distinguished from graphites prepared by exotic processes such as recrystallization under pressure) are of an apparent density of about 1.70 gm/cc, while the real density of graphite is 2.26 gm/cc. Also, undesirable anisotropic changes in physical properties are brought about by neutron bombardment, etc., of the two-phase (anisotropic) graphites that previously have been available for use in nuclear reactors. Improved graphites and carbons are also needed for nose cones for atmospheric entry vehicles, leading edges and other exposed surfaces of hypersonic aircraft, jet guidevanes, combustion chambers and rocket nozzles, etc. In everyday use, improved carbons and graphites are needed for bearings, electrodes for heating and electrical discharge machining, illumination, brushes for electrical motors and for transfer from a power rail to a vehicle, etc.

In accordance with this invention, high dense unitary bodies of uniformly distributed pore structure are formed without the use of binders. Graphitizable bodies are formed by heating a graphitizable carbon source, as defined hereinafter, for a sufficient time at an appropriate temperature to drive sufficient gases therefrom to convert the liquid to an amorphous, substantially infusible plastic. The original source material is not converted to coke but is only heated until a plastic, amorphous precursor having about 3% to about 11% volatile content is produced. The plastic precursor is then comminuted to a very fine powder and the powder compressed into self-bonded, amorphous green bodies without the use of any binder of plasticizer. The green body is then converted to dense, homogeneous carbon by heating to a temperature of about 800° C to about 1200° C or directly graphitized in a single step by controlled heating to a temperature of about 2500° C in a non-oxidizing environment. The process yields bodies of synthetic graphite having a density of about 1.90 gm/cc to about 2.00 gm/cc. Moreover, the graphite bodies have a very fine and extremely uniform pore structure with pore sizes as low as 0.03 micron.

The body produced is composed of single phase, uniformly distributed crystallites of highly uniform size and structure chemically bonded into a uniform, monolithic structure. Since the final product is of uniformly high density and of a single phase composition, it exhibits highly desirable physical, mechanical, chemical and electrical properties.

It is therefore a major object of this invention to provide a method for making a carbon or graphite body of greatly improved strength and reliability.

Another object is to provide a method for making an isotropic and (except for pores) homogeneous carbon or graphite body.

A further object is to provide a method of making carbon or graphite bodies of higher density than previously commercially available carbons and graphites.

A further object is to produce monolithic bodies of synthetic graphite of low porosity and having uniformly distributed, very fine pores of substantially uniform size.

Another object is to produce a comminuted, substantially infusible plastic precursor which may be molded into green bodies suitable for conversion to carbon and/or graphite without the use of binders or plasticizers.

Still another object is to provide a method for making a green body from which carbon or graphite is to be made and which is of significantly less volatile content than previous green bodies.

A still further object is to provide a method for making a green body from which carbon or graphite is to be made and which can be converted into carbon in only a small fraction of the time required under previous methods and which, in many applications, makes it economically feasible to accomplish carbonizing and graphitizing in a single, continuous process.

An additional object is to provide a method of making a green body from which carbon or graphite may be made and which is of such lessened tendency to crack or swell when heated that temperatures can be raised much more rapidly during the carbonizing period.

Another object is to provide a method for making a green body from which carbon or graphite may be made and which is of such smaller and more predictable shrinkage that it is readily feasible to mold carbon or graphite bodies to shape and to produce the desired finished bodies therefrom with little or no finishing operations for bringing them to final shape and size.

A further object is to provide a method whereby carbon and graphite bodies of higher qualities than previously known can be produced at lower cost than previous top-grade graphites and in which carbon and graphite bodies of more ordinary qualities can be produced at a small fraction of their previous cost.

Yet another object is to provide a method for making a carbon or graphite body that does not require the use of a binder or plasticizer.

A still further object is to provide a composition of matter which, when ready for forming into a green body transformable into carbon or graphite, can be stored indefinitely, either before or after forming into a green body, without chilling and without deleterious effect upon the quality of the carbon or graphite body made therefrom.

Still another object is to provide a composition of matter from which can be readily produced carbon or graphite bodies yielding some or all the advantages mentioned above.

Other objects, features and advantages of the invention will become more readily understood from the following detailed description taken in connection with the appended claims.

For formation of the precursor of the invention, a graphitizable raw material is selected which is readily available in economical quantities. Any organic material which passes through a liquid phase during pyrolysis and leaves a carbon residue is theoretically usable. From practical considerations, polyvinyl chloride, acenaphthylene, coal tar pitch, petroleum pitch and similar low volatility hydrocarbons are particularly suitable. As used herein, the terms "graphitizable raw material" and "graphitizable carbon source" mean any organic material which passes through a liquid phase during pyrolysis and leaves a carbon residue.

The graphitizable carbon source starting material is pyrolyzed in an inert environment by gradually heating it to a temperature between about 350° C and about 700° C until a substantially infusible, plastic precursor is obtained. The rate at which the starting material is heated and the final temperature to which it is heated may vary with different materials, the amount of volatile content, the physical size of the body of starting material under pyrolysis and the limitations of the carbonizing apparatus used. It will be apparent that the process of forming the precursor of the invention may be either a batch process or a continuous process.

For purposes of illustration, batch processing will be described in detail. It should be recognized, however, that with appropriate adjustments in temperatures and with proper equipment the principles of the invention are equally suitable for use in a continuous process.

Of the wide range of materials suitable for use as the starting material, petroleum pitch is presently most attractive because of economic considerations and its generally relative freedom from non-volatile ash-producing impurities. Conventionally, petroleum pitch will contain about 40% to about 60% volatile material by weight.

The starting material is placed in a suitable container and heated in a non-oxidizing environment. Ordinarily, the heating vessel is enclosed and an inert gas such as nitrogen or a noble gas flushed through the heating vessel during the pyrolysis process to carry off gases evolved while preventing oxygen from entering the system.

In accordance with the invention, a precursor of the desired composition is obtained by heating the starting material as described above until the material is converted by pyrolysis from a liquid to an infusible plastic or to an earlier point (as further defined hereinafter) where the rate of heating to be encountered in further processing will not puff, foam, swell, distend, crack or otherwise cause a body formed from the comminuted product thereof to lose its structural integrity before a condition of true infusibility is attained. In practice, the starting material is heated from ambient temperature to a temperature between about 425° C and about 500° C at a rate of about 10° C per hour to about 100° C per hour, depending upon the physical size and geometry of the bulk material and the pyrolysis furnace, and maintained at this temperature until the liquid-to-amorphous solid phase change is achieved. As indicated above, pyrolysis is preferrably stopped as soon as the transition from liquid to solid occurs. At or near the transition point the solid material is substantially infusible but still plastic. As used herein, the term "plastic" means capable of being deformed sufficiently to permit particles of the material to be self-adherent to each other when subjected to compressive force. The terms "infusible", "true infusibility", etc., as used herein refer to a condition wherein the material is a solid consisting essentially of carbon and thus will not melt below the melting point of carbon, i.e., will not change from a solid to a liquid merely be heating at temperatures below the melting point of carbon. The term "substantially infusible" as used herein refers to a condition where the material is a solid consisting essentially of carbon and no more than about 11% volatile materials and therefore is so near the point of being infusible that it will become infusible if heated under controlled conditions as described hereinafter. The terms "volatiles", "volatile materials", "heat evolvable materials" and the like are used in their ordinary sense to mean materials which may be vaporized under near atmospheric conditions by the application of heat. The term "volatile content", therefore, means the weight per cent of the material which is volatile material.

Various methods of determining volatile content have been used in the carbon industry. Unfortunately, the value for volatile content of any particular material is dependent upon the method by which volatile content is measured. Accordingly, to ensure that each sample of precursor material used or produced in accordance with this invention may be defined in terms of a precise value of volatile content, the following method of determining volatile content had been devised:

A sample of the material is ground in a hammer mill and the particulated material then pressed into a rectangular body 1 inch × 1 inch × 4 inches. The body is then weighed. The body is then heated at the rate of 100° C/hr to 400° C and immediately thereafter heated to 900° C at the rate of 25° C/hr. The body is then allowed to cool to room temperature. All heating and cooling is conducted in an inert environment. The cooled body is then weighed. The weight loss determined by this process is designated as the volatile content of the body of material.

The term "volatile content", therefore, as used herein means volatile content as determined by the above-described method.

In accordance with the above definitions the precursor formed in practicing this invention is plastic so long as particles thereof may be bound together into a dense coherent body merely by application of pressure without the use of binder materials or heat. Plastic particles, when mutually compressed, deform sufficiently to minimize the space occupied, thereby maximizing mutual surface area contact between particles and enhancing self-bonding by molecular attraction, mechanical interlocking, Van der Waals forces, etc. Since the material is infusible or substantially infusible, as defined above, the term "plastic" should not be confused with fusibility. The infusible or substantially infusible material may be formed into a coherent body so long as it is plastic as defined above. The term "plastic" is not intended to refer to materials which may be deformed by fusion.

At the transistion point where the starting material changes from a liquid to a solid during pyrolysis the material still contains appreciable amounts of volatile material. If pyrolysis is continued, the volatile material will be evolved and the solid material will no longer be plastic. Accordingly, pyrolysis should be stopped while the material is in the plastic condition. The plastic condition, however, may occur slightly before the material becomes infusible. Likewise, the material may remain plastic for a short time if pyrolysis is continued after a condition of infusibility is attained. Accordingly, since the precursor must be both plastic and either infusible or so near the point of infusibility that a body formed from comminuted particles thereof will not melt, puff, foam, swell, crack, or otherwise lose its structural integrity during heating before a condition of true infusibility is reached, the precursor formed in accordance with the invention will be described as a "substantially infusible plastic" solid.

Since the precursor of the invention must be plastic, as defined above, to permit formation of dense, self-adherent green bodies by pressing particles thereof together and must be substantially infusible, as defined above, to assure that the green body will not lose structural integrity during the final carbonization and subsequent graphitization, and since the plastic condition is generally achieved concurrently with or before the point where a condition of true infusibility is achieved, the preferred method of forming the precursor of the invention is to pyrolyze the graphitizable carbon source no more than to the point where a condition of true infusibility is reached. For practical considerations, the pyrolysis is stopped in most cases as soon as the liquid to solid phase change is achieved.

In the preferred method of practicing the invention, the starting material is heated from ambient temperatures to about 450° C at rates of about 10° C per hour to about 30° C per hour. The rate at which the temperature is increased is limited by equipment capabilities, the physical size of the mass being heated, and the volatile content of the mass of starting material. Extremely low heating rates are impractical from economic considerations. The maximum rate at which the mass may be heated is basically determined by the physical mass of the starting material and the volatile content. When larger masses of starting materials are heated, lower rates of temperature increase are used to permit adequate heat transfer through the core of the mass. Care should be exercised to ensure that the entire mass of starting material is heated substantially uniformly, thus avoiding the establishment of large temperature gradients across the mass of material. Furthermore, too rapid heating of materials with high volatile content will result in excessive bubbling, causing macromolecular particles of the starting material to become airborne and lost in the flowing inert environment. Excessively rapid heating also causes non-uniform pyrolysis. Since control of the pyrolysis temperature is important to determining completion of the precursor formation step, excessively high heating rates should be avoided.

It will be apparent that the starting material could be heated at a controlled rate to a temperature higher than 500° C and then allowed to partially cool before the phase change is achieved, relying on the residual thermal energy absorbed by the mass to complete the pyrolysis conversion before the mass is cooled below about 350° C. This technique may conserve time in the overall operation but requires careful control of the heating cycle to ensure that the entire bulk of the mass is uniformly converted to the substantially infusible plastic state.

It should be observed that the maximum temperature attained during formation of the precursor may vary with the method used. Higher temperatures may be conveniently used in continuous processes. Conversely, where large batches are used in batch process, the maximum temperature may be lower but the heating time increased. For most materials in moderate-sized batch processes, a final temperature in the range of about 425° C to about 475° C is usually suitable.

The temperature need not necessarily be increased at a uniform rate of change. The temperature may be increased step wise and maintained for short periods at lower temperatures during the heating process to avoid excessive foaming when required.

It should be observed that the precursor formed by the pyrolysis step described above has not been completely pyrolyzed to pure carbon. Instead, the pyrolysis is stopped as soon as the liquid is converted to a substantially infusible plastic mass. At this point the precursor still contains from as much as 11% to as little as 3% volatile content, depending upon the composition of the original starting material and the temperature at which the phase change is effected. Accordingly, the precursor formed is vastly different from carbon materials conventionally used for green bodies in making graphite. However, since the precursor formed is an amorphous plastic mass, particles thereof may be formed into coherent bodies by compression without the use of any binder materials or heat.

The amorphous precursor formed as described above is comminuted to a fine powder with any suitable grinding or milling equipment. In the preferred process, the precursor is comminuted to particles of less than about ten microns in diameter in a ball mill. It is important that the particles of precursor be of substantially uniform size. Preferably, the average particle size is one to two microns with substantially no particles larger than ten microns in their largest dimension. Milling is best accomplished by extended wet ball milling to form particles of the desired one to two microns diameter.

Although the precursor product prepared as directed above is plastic, it is substantially infusible and readily comminuted by conventional grinding and milling equipment. It should be also noted that since the precursor is substantially infusible, it is not subject to becoming gummy during grinding or milling and need not be chilled for milling. In fact, the precursor need not even be cooled to ambient temperatures but may, if desired, be comminuted at any temperature below about 300° C.

When the precursor is formed in a batch process the entire batch, because of heat and gas transfer difficulties, may not be uniformly pyrolyzed. Accordingly, better results are achieved when the comminuted particles are thoroughly mixed after or during milling. Mixing can be best achieved, by mixing the comminuted precursor particles in a liquid carrier such as pentane, trichlorotrifluoroethane, or the like to form a slurry. The slurry may then be thoroughly agitated to ensure uniformity of composition of the powder and provide a convenient means for handling the powder. Use of a liquid carrier also permits grinding in an inert environment. Since the precursor is totally immersed in the carrier, oxidation of the precursor during milling and subsequent handling is substantially prevented.

The carrier fluid is preferably an easily volatilized liquid in which the precursor is insoluble or substantially insoluble and which may be vaporized at relatively low temperatures without leaving a residue. Freon 113 (trichlorotrifluoroethane), pentane, methyl alcohol, and water have been found suitable. After grinding and mixing, the carrier may be removed by heating the slurry in an inert environment, such a flowing nitrogen, to remove the carrier and leave only the finely comminuted precursor. Where the carrier is water, a wetting agent may be required. To ensure complete removal of the wetting agent, the powder may be washed and filtered before final drying.

After the slurry is dried to a powder, the comminuted precursor is placed in a mold of desired size and shape. A green body is then formed by applying sufficient pressure to the precursor particles to form a coherent body.

It will be observed that since the precursor is an amorphous plastic and not completely pyrolyzed, the particles may be formed into a coherent mass by applying sufficient pressure to casue self-bonding by the combined effects of deformation adhesion, Van der Waals forces, etc. Pressures as low as 500 psi or lower are sufficient to form a coherent mass from the precursor as described. Ordinarily, isostatic pressures from about 500 psi to about 80,000 psi are applied to form a coherent body of maximum density. The body, of course, may be formed in any desired configuration by using appropriately designed molds and presses. Finer particle sizes generally yield higher density green bodies as well as higher density graphite and permit molding at lower pressures. Since the green bodies are self-bonded without a plasticizer or binder, they may be stored indefinitely without any special care or storage facilities.

Green bodies formed as described above have a volatile content of about 3% to about 11% since they are comprised solely of precursor formed as described. This volatile content is appreciably higher than the volatile content of calcined coke used in conventional graphite-making processes. However, calcined or uncalcined coke must be mixed with a binder or a plasticizer to form a coherent green body. Accordingly, green bodies formed by conventional processes contain significantly greater volatile content when both the coke and binder or plasticizer are considered. For this reason, conventional green bodies must be further pyrolyzed to carbonize the binder or plasticizer. Because of the significant amounts of gas evolved from the binder or plasticizer, the carbonizing step is carried out under carefully controlled, time consuming heating conditions in a first furnace. The green body is then cooled and transferred to a second furnace for graphitizing.

Green bodies formed in accordance with the present invention may be converted directly to pure amorphous carbon or to graphite, as desired, by further controlled heating in an inert environment. It should be observed that the green body contains an appreciable amount of volatile material which will be evolved by further pyrolysis. However, the evolvable material is uniformly distributed throughout the green body (contained in relatively constant proportion in each of the fine particles) as contrasted to the nonuniform distribution of heat-evolvable materials in conventional two-phase green bodies formed of calcined coke and binder or raw partially plasticized coke. Furthermore, since the total volatile content is much less than that of conventional green bodies, final carbonization and graphitization may be economically performed in a single, relatively rapid heating process using only a single furnace. Furthermore, the green body is of extremely uniform density since it is comprised solely of uniformly sized particles of the precursor uniformly self-bonded together into a dense mass. Accordingly as the green body is heated, essentially all remaining volatile materials are removed uniformly from the body, thus resulting in the formation of a highly dense body with extremely fine and extremely uniform pore structure. Because of the compact, single phase physical bonding of the precursor particles in the green body, the final carbonization process promotes chemical bonding between the particles to form a unitary monolithic body of amorphous carbon held together by chemical carbon-to-carbon bonding of carbon particles which originated from the same source. Therefore, physical interfaces between adjacent particles are essentially eliminated and the final product is a unitary, continuous, homogeneous body of carbon atoms chemically bonded to carbon atoms. The amorphous carbon body thus formed may then be converted directly to graphite by appropriate heating.

As noted above, conversion of the green body to amorphous carbon or graphite may be achieved in a single controlled heating process. Since the precursor was formed by converting a liquid to a plastic above 400° C, the green body may be heated directly to 400° C as rapidly as may be practically achieved if care is taken to avoid extreme temperature gradients across the body. Heating above about 400° C, however, must be controlled since appreciable amounts of volatile materials will be evolved. Accordingly, heating from about 400° C to about 1200° C must be accomplished at controlled rates. If the temperature is raised too rapidly between these temperatures, gas evolution may cause puffing and rupture of the green body. Furthermore, if the precursor was formed at a temperature or under conditions which produced a conversion form liquid to amorphous solid without reaching the point of true infusibility, the green body may partially melt, resulting in the formation of trapped gas bubbles. Obviously, trapped gases will destroy the integrity of the body by swellling, cracking, foaming, etc., thereby rendering the body useless for further processing. As pointed out above, the precursor is formed by stopping the pyrolysis step as soon as the bulk material is converted from a liquid to substantially infusible mass. Thus a green body made from a precursor which is not a true infusible mass may not survive temperature increases at a rate of 100° C per hour between the highest temperature used in formation of the precursor and about 1000° C, yet be satisfactorily converted when heated at slower rates, such as a rate of 10° C per hour.

The rate at which the temperature may be increased is limited by the rate at which volatile materials can be released without causing undue stress on the structure. Factors which affect the release of volatiles are physical size of the green body, particle size of the comminuted material, and molding pressure used in forming the body. Larger bodies, higher molding pressures, and smaller particle sizes require slower heating rates to allow relief of gas stresses without rupturing the body structure. Therefore the rate of increase in temperature may vary from as low as 3° C per hour to as high as 250° C per hour or higher in the temperature ranges where significant gas evolution will occur, e.g., between about 400° C and about 800° C, and, to a lesser extent, between about 800° C and 1200° C.

If the green body is to be converted to pure amorphous carbon, heating may be terminated after a temperature of between about 1200° C and about 1500° C is achieved. At this temperature the precursor has been completely pyrolyzed and the residue is in the form of a homogeneous body of dense amorphous carbon. To ensure that the entire body has been uniformly carbonized, the maximum final temperature attained should be held a sufficient time to permit temperature equilibrium to be reached throughout the entire body.

It should be observed that the green body, composed of uniformly compacted particles of precursor containing uniformly distributed volatile material, physically shrinks during the carbonizing process due to loss of volatile materials. However, since the green body precursor was formed from infusible or substantially infusible material, the physical state of the body remains solid. Accordingly, the body shrinks while maintaining structural integrity and the resultant carbon body is uniformly reduced in size. It should be observed, however, that during the shrinking process the body is being gradually heated so that the temperature of the outer portion of the body is higher than the core. This causes the body to be subjected to compressive stress which advantageously aids in forming a high density carbon body.

Since the green body of the invention is of uniform composition and the volatile content is uniformly distributed, shrinkage occurs uniformly and predictably. Accordingly, green bodies formed to have the physical shape of the desired carbon or graphite body with dimensions appropriately larger than the desired dimensions of the final product will shrink to the desired dimensions during pyrolysis and/or graphitization. Therefore, using the processes of the invention, dense amorphous carbon bodies and graphite bodies may be produced which have the desired shape and size with little or no further milling, shaping or sizing.

Since the precursor from which the green body was formed was substantially pyrolyzed before physical formation of the green body, the body produced therefrom by further pyrolysis is homogeneous, high density carbon. The resultant carbon body may therefore be converted directly to high density graphite by heating it to graphitizing temperatures.

Most importantly, the graphtizing step may be accomplished in the same furnace without ever cooling the carbon body. To form graphite, the heating process is continued until graphitizing temperatures are reached. Since the body need not be transferred to a separate graphitizing furnace, the time and heat energy ordinarily lost by cooling, physically transferring, and reheating the body is conserved. Furthermore, since essentially all heat-evolvable gases have been removed in the carbonizing step, the body may be heated to graphitizing temperatures as rapidly as the heating equipment will permit without forming excessive temperature gradients across the body. Heating directly to graphitizing temperatures further avoids the formation of stresses caused by cooling and re-heating the body. Since no thermal stresses have been introduced by cooling, the body may be rapidly heated to graphitizing temperatures without concern for relieving stresses caused by temperature cycling.

It should be observed that as the carbon body is converted to graphite the body continues to physically shrink. This shrinkage, however, is not the result of evolution of volatile material but essentially the result of molecular rearrangement as the amorphous carbon is converted to graphite. However, since the carbon body is of highly dense, uniform composition, shrinkage will occur uniformly.

Formation of graphite from amorphous carbon occurs whenever graphitizable carbon is heated with sufficient energy to supply the activation energy required. Graphitization does not normally occur below about 1800° C. Theoretically, a carbon body maintained at the minimum temperature for a sufficiently long period of time would eventually be completely converted to graphite. In practice, however, the carbon body is heated to temperatures between about 2200° C and 3000° C to effect graphitization.

In accordance with the preferred practice of the present invention, the carbon body formed as described above is heated directly to a temperature between about 2200° C and about 2800° C. Most preferably, the body is heated to a temperature between about 2200° C and 2500° C and then maintained at that temperature for periods up to about two hours or longer to ensure complete temperature equilibrium throughout the body.

Since equipment capabilities and heat transfer across the solid body are the limiting factors in heating above about 1500° C, it is preferable to heat the body to a temperature of about 2200° C to 2500° C and then maintain the maximum temperature for a time sufficient to ensure complete equilibration. This ensures that the entire body is completely and uniformly graphitized.

Once the entire body has reached equilibrium at the desired maximum temperature, the furnace may be turned off and the graphite allowed to cool to ambient temperature.

Graphite produced by the process described above had been found to exhibit densities as high as about 2.00 gm/cc. Most significantly, however, the graphite bodies are of uniform density and are homogeneous unitary bodies of single phase structure. The remaining pores are extremely small, on the order of 0.03 to 0.30 micron in diameter and uniformly distributed throughout the entire graphite body.

The following examples illustrate the range of conditions under which the principles of the invention may be utilized to produce unitary dense bodies of amorphous carbon and/or synthetic graphite. These examples, of course, are not intended to illustrate all conditions which are suitable.

EXAMPLE I

Two beakers containing a total of 408 grams of acenaphthylene were placed in an Inconel muffle in a ceramic furnace under a nitrogen atmosphere. The furnace was heated to 475° C at a rate of 50° C per hour, held at this temperature for four hours, and then allowed to cool at the natural cooling rate of the furnace. This procedure produced 175 grams of product which was ground to a fine powder in a laboratory hammer mill. A sample of this powder was pressed into a right cylinder in a double ended die at a pressure of 10,000 psi. The resultant green body had a density of 1.182 gm/cc. This green body was heated in a nitrogen atmosphere to 1000° C at a rate of 10° C per hour, yielding a carbon body with a density of 1.457 gm/cc while suffering a weight loss of 1.06%. This carbon body was converted to graphite by rapid heating to 2500° C in an induction furnace under a nitrogen atmosphere. This process produced a weight loss of 0.83%. The density of the graphite body was 1.51 gm/cc.

EXAMPLE II

A second sample of acenaphthylene was pyrolyzed and ground as described in Example I. The powder was then isostatically pressed into a green body at 10,000 psi. The density of the green body was 1.208 gm/cc. This green body was heated as described in Example I and the following results were obtained:

| | |
|---|---|
| Weight loss on carbonizing | 3.41% |
| Density of carbon body | 1.507 gm/cc |
| Weight loss on graphitizing | 0.64% |
| Density of graphite body | 1.579 gm/cc |

EXAMPLE III

A third sample of acenaphthylene was treated as described in Example II but isostatically pressed at 72,000 psi. The following results were obtained:

| | |
|---|---|
| Density of green body | 1.319 gm/cc |
| Weight loss on carbonizing | 1.82% |
| Density of carbon body | 1.64 gm/cc |
| Weight loss on graphitizing | 2.70% |
| Density of graphite body | 1.753 gm/cc |

EXAMPLE IV

A beaker containing 250 grams of acenaphthylene was placed in an Inconel muffle in a ceramic furnace under a nitrogen atmosphere. The furnace was heated to 462° C at a rate of 50° per hour and then allowed to cool at the natural cooling rate of the furnace. This procedure produced 95.6 grams of product which was ground to a fine powder in a laboratory hammer mill. Samples of this powder were isostatically pressed into bodies at pressures of 10,000 and 72,000 psi. The green body densities were 1.258 and 1.341 gm/cc, respectively. These bodies were baked in a nitrogen atmosphere at a rate of 10° per hour to 1000° C. Upon opening the baking furnace, it was found that these bodies had melted.

EXAMPLE V

Two beakers containing a total of 500 grams of coal tar pitch were placed in an Inconel muffle in a ceramic furnace under a nitrogen atmosphere. The furnace was heated to 475° C at a rate of 50° per hour, held at this temperature for four hours, and then allowed to cool at the natural cooling rate of the furnace. This procedure produced 314 grams of product which was ground to a fine powder in a laboratory hammer mill. Samples of this powder were isostatically pressed into bodies at pressures of 10,000 and 72,000 psi. The green body densities were 1.241 and 1.364 gm/cc, respectively. These green bodies were baked in a nitrogen atmosphere at a rate of 10° per hour to 1000° C, yielding carbon bodies with densities of 1.510 and 1.657 gm/cc, respectively, while suffering weight losses of 6.85% and 6.56%, respectively. These carbon bodies were converted to graphite by rapid heating to 2500° C in an induction furnace under a nitrogen atmosphere. This process produced weight losses of 2.70% and 2.54%, respectively. The respective densities were 1.665 gm/cc and 1.881 gm/cc.

EXAMPLE VI

A 250 gram sample of coal tar pitch was treated exactly as described in Example V except that the starting material was heated to 462° and maintained at that temperature for two hours, yielding 171.5 grams product. The green body densities were 1.286 gm/cc and 1.387 gm/cc, respectively. Both bodies melted during baking.

EXAMPLE VII

A 250 gram sample of coal tar pitch was treated exactly as described in Example V except that the starting material was heated to 470° C and maintained at that temperature for two hours, yielding 166.0 grams product. The following results were obtained:

| | |
|---|---|
| Density of green bodies | 1.256 and 1.386 gm/cc |
| Density of carbon bodies | 1.542 and 1.778 gm/cc |
| Density of graphite bodies | 1.792 and 1.980 gm/cc |

EXAMPLE VIII

A beaker containing 250 grams of Monsanto Resin PR was placed in an Inconel muffle in a ceramic furnace under a nitrogen atmosphere. The furnace was heated to 462° C at a rate of 50° per hour and then allowed to cool at the natural cooling rate of the furnace. This procedure produced 95.6 grams of product which was ground to a fine powder in a laboratory hammer mill. A sample of the powder was isostatically pressed into a body at a pressure of 72,000 psi. The green body density was 1.271 gm/cc. This green body was baked in a nitrogen atmosphere at a rate of 10° per hour to 1000° C yielding a carbon body with a density of 1.661 gm/cc. This carbon body was converted to graphite by rapid heating to 2500° C in an induction furnace under a nitrogen atmosphere. The graphite body had a density of 1.781 gm/cc.

EXAMPLE IX

The hammer milled powder from Example VII was ball milled in hexane for 48 hours. This powder was dried and isostatically pressed into a body at 72,000 psi with a density of 1.405 gm/cc. This body was baked and graphitized at the heating rate set forth in Example VII and produced a carbon body having a density of 1.919 gm/cc which was severely cracked. The graphitized body suffered even more severe cracking and its density was not determined.

EXAMPLE X

The hammer milled powder of Example VII was ball milled in water with a Triton X-100 wetting agent for 44 hours. This powder was washed to remove the wetting agent, dried, and then isostatically pressed into a body at 72,000 psi with a density of 1.346 gm/cc. This body was baked and graphitized at the rate set forth in Example VII to produce a carbon body with a density of 1.680 gm/cc and a graphite body with a density of 1.891 gm/cc. The graphite body, however, was cracked.

EXAMPLE XI

A small vertical cylindrical reactor with a hemispherical bottom was fabricated from aluminum to fit into a heating mantle usually used for the heating of resin kettles. Fifteen hundred grams of coal tar pitch having a softening point of 105°-110° C were placed in this reactor and heated to 500° C in five hours and allowed to cool overnight. One thousand and twenty grams of precursor were obtained. The yield from this run and several identical runs were combined, reduced to a powder in a laboratory hammer mill, and then ball milled in petroleum ether for 48 hours. Eighteen bodies having green densities of 1.199 to 1.364 gm/cc were formed from this fine milled powder by isostatically pressing at pressures of 10,000 to 82,000 psi. These bodies were heated to 1200° C in a nitrogen atmosphere at a rate of 10° C per hour. Only the 10,000 and 20,000 psi specimens survived the heating process and these had densities of 1.757 and 1.932 gm/cc.

EXAMPLE XII

A vertical cylindrical reactor 12 inches in diameter by 15 inches high was fabricated from aluminum. Thirty pounds of 155° C softening point coal tar pitch were charged to this reactor and the reactor was placed in a ceramic kiln. The reactor was heated to 520° C in six hours and held at this temperature for one and one-quarter hours, then allowed to cool overnight. Twenty and one-half pounds of precursor were produced. Four more runs were conducted in a like manner and the resultant product combined and blended into a single batch and passed through a laboratory hammer mill. Five green bodies having densities ranging from 1.261 to 1,371 gm/cc were produced from this hammer milled material by isostatically pressing at pressures from 10,000 to 50,000 psi. These bodies were heated to 1000° C at 100° C per hour and then graphitized to 2500° C in a nitrogen atmosphere. The weight loss on carbonizing averaged 5.93% and the carbon body densities ranged from 1.582 to 1.720 gm/cc. The average weight loss due to graphitization was 1.82% and the graphite body densities ranged from 1.744 to 1.891 gm/cc.

EXAMPLE XIII

The hammer milled powder from Example XII was dry ball milled for 48 hours. This milled powder was isostatically compacted into five bodies at pressures of 5,000 to 25,000 psi producing green bodies with densities ranging from 1.193 to 1.369 gm/cc. These bodies were heated to 1000° C at 100° C per hour and then graphitized to 2500° C in nitrogen atmospheres. The weight loss on carbonizing averaged 6.11% and the carbon body densities varied from 1.528 to 1.725 gm/cc. The average weight loss due to graphitization was 1.80% and the graphite body density ranged from 1.719 to 1.957 gm/cc. The highest density (highest pressure) body cracked during graphitization.

EXAMPLE XIV

The hammer milled product from Example XII was ball milled in water with Triton X-100 wetting agent and washed and dried. The powder was then formed into green bodies and heated as described in Example XIII. Green body densities were 1.116 to 1.332 gm/cc. Average weight loss on carbonizing was 7.61%. Carbon body densities were 1.380 to 1.612 gm/cc. Average weight loss on graphitization was 1.73%. Graphite body densities were 1.512 to 1.795 gm/cc.

EXAMPLE XV

The conditions of Example XII were repeated except that the powder was ball milled in methanol. Green body densities were 1.114 to 1.347 gm/cc. Average weight loss on carbonizing was 6.75%. Carbon body densities were 1.415 to 1.684 gm/cc. Average weight loss on graphitization was 1.75%. Graphite body densities were 1.533 to 1.911 gm/cc. The highest density specimen was cracked.

EXAMPLE XVI

The conditions of Example XII were repeated except that the powder was ball milled in ethyl ether. Green body densities were 1.099 to 1.314 gm/cc. Average weight loss on carbonizing was 7.76%. Carbon body densities were 1.363 to 1.640 gm/cc. Average weight loss on graphitization was 1.84%. Graphite body densities were 1.528 to 1.910 gm/cc. The highest density specimen was cracked.

EXAMPLE XVII

The hammer milled powder from Example XII was dry ball milled for 48 hours. The ball milled powder was isostatically compacted into green bodies at 10,000, 20,000 and 30,000 psi. These bodies were placed in an induction furnace and heated from room temperature to 2500° C in 24 hours. The 10,000 psi specimen had a density of 1.812 gm/cc, the 20,000 psi specimen had a density of 1.936 gm/cc, and the density of the 30,000 psi body was 1.965 gm/cc. All bodies were sound.

EXAMPLE XVIII

In the reactor described in Example XII, thirty pounds of 105° C softening point coal tar pitch were heated to 500° C in three hours and held for five hours and then allowed to cool overnight. The precursor yield was 15.6 pounds. The process was repeated twice and the three batches blended and powdered in a laboratory hammer mill. The hammer milled powder was then processed through a fluid energy mill to further reduce the particle size. A body was formed from this fine powder by isostatically pressing at 15,000 psi. This body was heated under nitrogen from room temperature to 2500° C in 24 hours using an induction furnace. The graphite body thus produced had a density of 1.913 gm/cc.

EXAMPLE XIX

In the reactor described in Example XII, thirty pounds of 180° C softening point coal tar pitch were heated to 500° C under nitrogen and held at that temperature for four hours. The yield was 18.6 pounds. Four more batches of precursor were prepared under the same conditions and the batches were blended and powdered in a laboratory hammer mill. The material was further ground in a jet mill with steam. This powder was then formed into a body by isostatically pressing at 25,000 psi. This body was heated from room temperature to 2500° C in 24 hours under a nitrogen atmosphere in an induction furnace. The resultant graphite body had a density of 1.911 gm/cc.

EXAMPLE XX

In the reactor described in Example XII, twenty-five pounds of Ashland Petroleum Pitch 240 were heated to 470° C at a rate of 100° per hour and held at this temperature for 24 hours and allowed to cool overnight. The resultant precursor was ground in a laboratory hammer mill, divided into four batches and ball milled in pentane for 2, 4, 8 and 16 hours, respectively. The ball milled powder was then dried and formed into bodies by isostatically pressing at 10,000 psi. These bodies were then heated from room temperature to 2500° C under a nitrogen atmosphere in 24 hours in an induction furnace. The graphite body densities were 1.827, 1.848, 1.900 and 1.925 gm/cc for the 2, 4, 8 and 16 hour milling times, respectively.

EXAMPLE XXI

A chemical reactor was constructed from a thin walled cylinder of stainless steel 12 inches in diameter with a working length of 24 inches. The exterior was wound with insulated resistance wire to provide heating. The end closures were made with aluminum inner doors which were held in place by bolts projecting through stainless steel outer doors. The resistance wire was wound several inches beyond each inner door to eliminate end effects, relying upon the greater thermal conductivity of aluminum to maintain temperatures at the ends that would be the same as those in the interior. Sixty pounds of Ashland Petroleum Pitch 240 were charged to this reactor and heated to 470° C under a nitrogen atmosphere at a rate of 50° per hour. The pitch was held at this temperature for a period of 23 hours and then allowed to cool. Thirty-eight and one-fourth pounds of precursor were produced. This material was ground in a laboratory hammer mill and formed into bodies by isostatically pressing at 15,000 and 25,000 psi. These bodies were baked at 100° C per hour to 1000° C under nitrogen in a ceramic kiln. Sound carbon bodies were produced with a weight loss of 7.41% for the 15,000 psi material and 7.68% for the 25,000 psi specimen.

EXAMPLE XXII

The reactor of Example XXI was scaled to a larger size with a diameter of three feet and a working length of six feet. This reactor was charged with 1600 pounds of Ashland Petroleum Pitch 240 and heated to 160° C rapidly and held at this temperature for 48 hours, rapidly heated to 270° C and held for 15 hours, then heated to 470° C at a rate of 25° C per hour and held for 23 hours, then allowed to cool. The approximately 1000 pounds of precursor were crushed, hammer milled and conveyed to a product collector. Samples of this material were further ground in a vibratory ball mill in pentane for periods of 1, 2 and 3 hours. Bodies were formed from the hammer milled and ball milled product by preforming in a rectangular mold at 800 psi and then isostatically pressing at pressures from 5,000 to 30,000 psi. These green bodies were approximately 2½ inches by 7½ inches by 20 inches and weighed about 16 pounds.

The green bodies were placed in an induction furnace and heated from room temperature to 2500° C under nitrogen in 107 hours. The graphitization process caused a weight loss of about 10% and yielded graphite bodies with densities from 1.52 to 1.91 gm/cc. The lower densities corresponded to shorter milling times and to lower molding pressures, while the higher densities corresponded to longer grinding times (with resultant smaller particle size) and to higher molding pressures.

EXAMPLE XXIII

The reactor described in Example XXII was charged with 1600 pounds of Ashland Petroleum Pitch 240. The pitch was heated to 200° C from room temperature in 12 hours and held at this temperature for 12 hours, then heated to 460° C in 12 hours, held at this temperature for 18½ hours and allowed to cool. Nine hundred and thirty pounds of precursor were recovered and crushed, hammer milled and conveyed to a product collector. The product collector was emptied into a container and blended with 175 gallons of Freon 113 (trichlorotrifluoroethane). A sample of this blend was ground in a vibratory ball mill for 2½ hours with Freon 113 and dried under nitrogen. A specimen was formed from the ball milled product by preforming in a rectangular mold at 700 psi, then isostatically pressing at 20,000 psi. The green body weighed 16 pounds and its dimensions were approximately 2½ inches by 7½ inches by 20 inches. The green body was placed in an induction furnace with a nitrogen atmosphere and heated from room temperature to 480° C in 40 hours, from 480° C to 1100° C in 110 hours, from 1100° C to 1400° C in 20 hours and from 1400° C to 2300° C in 15 hours. It was held at this temperature for two hours and allowed to cool. The graphite body produced was approximately 2 inches by 6 inches by 17 inches with a density of 1.924 gm/cc. The weight loss due to graphitization was 10.69%. The electrical resistivity of the graphite was $5.4 \times 10^{-4}$ ohm inches.

From the foregoing examples it will be observed that organic materials may be pyrolyzed to form a unique precursor material in accordance with the invention which may be comminuted and formed into green bodies suitable for conversion to high density carbon or graphite without the use of any binder materials. By eliminating the use of binders or plasticizers, carbonization of the green body is extremely rapid when compared to previous methods. Furthermore, the graphite produced is much more resistant to oxidation than graphite made by conventional processes.

Under investigation with a porosimeter, it has been found that the average pore size in graphite formed in accordance with the processes described above is about 0.09 to 0.30 micron in the high density graphites made from petroleum pitch precursors. Uniform average pore sizes in the range of 0.03 to 0.08 micron have been consistently observed in the higher density graphite made from coal tar pitch. It will be readily apparent that average pore sizes such as those observed are orders of magnitude smaller than that observed in conventional synthetic graphite.

It will be understood that the processes described hereinabove are particularly directed to producing amorphous carbon and graphite bodies of extremely high densities. Where high densities are not required, and where higher porosity can be tolerated or even be desirable, the processes described may also be used. Porosity, and hence density, of the final produce produced in accordance with the invention is largely a function of particle size of the comminuted precursor and the pressure used in forming the green bodies. Therefore, less dense bodies may be formed using the processes described herein if the precursor is comminuted into coarser particles. For example, instead of milling the precursor to fine particles, the precursor may be divided into particles of substantially uniform sizes of less than about 1000 microns in the largest dimension and pressed into green bodies to form less dense green bodies. When carbonized and/or graphitized, these less dense green bodies form less dense amorphous carbon bodies and/or graphite bodies. Moreover, since the less dense bodies have larger pores, gas evolution is generally easier to obtain without rupture of the body, thereby permitting even faster heating rates. Accordingly, the processes described may be advantageously used to produce amorphous carbon and graphite bodies having densities comparable to that produced by conventional processes in substantially shorter times than required for conventional processes. Furthermore, the less dense bodies have the additional advantage of uniformity, mechanical stability, etc. characteristic of the dense bodies produced in accordance with the invention and may be produced at a fraction of the cost of conventional processes.

While the invention has been described in detail with reference to laboratory size specimens and equipment, it will be readily understood that the processes may be used in large-scale commercial applications with proper equipment operated in accordance with the principles described. It is to be understood, therefore, that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

What is claimed is:

1. The method of making a precursor for forming green bodies suitable for conversion to unitary bodies of carbon comprising the steps of:
    a. producing a substantially infusible plastic residue having a volatile content of from about 3% to about 11% by heating a graphitizable carbon source which passes through a liquid phase during pyrolysis in a substantially non-oxidizing environment,
    b. discontinuing said heating while the residue remains plastic, and
    c. comminuting said substantially infusible plastic residue to form particles thereof having an average particle size less than about 1000 microns in the largest dimension.

2. The method set forth in claim 1 wherein said graphitizable carbon source is heated to a temperature between about 425° C and about 500° C and maintained at said temperature until and not appreciably beyond the time that said graphitizable carbon source changes from a liquid to a solid.

3. The method set forth in claim 1 wherein said graphitizable carbon source is heated from ambient temperature to a temperature between about 425° C and about 500° C at a rate of about 10° to about 30° per hour.

4. The method set forth in claim 1 wherein said substantially infusible plastic residue is comminuted by milling while immersed in a substantially non-oxidizing fluid.

5. The method set forth in claim 4 wherein said particles are thoroughly mixed while immersed in said fluid.

6. The process of making a coherent green body suitable for conversion to a dense body of carbon comprising the steps of:
 a. producing a substantially infusible plastic residue having a volatile content of from about 3% to about 11% by heating a graphitizable carbon source which passes through a liquid phase during pyrolysis in a non-oxidizing environment but heating said carbon source no more than necessary to produce a truly infusible residue,
 b. discontinuing said heating while the residue remains plastic,
 c. comminuting said residue into particles, and
 d. pressing said particles into a coherent body.

7. The process set forth in claim 6 wherein said residue is comminuted in a substantially non-oxidizing environment.

8. The process set forth in claim 6 wherein said residue is comminuted while immersed in a liquid carrier.

9. The method of producing unitary homogeneous bodies of carbon comprising the steps of:
 a. producing a substantially infusible plastic mass having a volatile content of from about 3% to about 11% by heating an organic material which passes through a liquid phase during pyrolysis in a non-oxidizing environment.
 b. discontinuing said heating while said mass remains plastic,
 c. comminuting said substantially infusible plastic mass into particles,
 d. pressing said particles into a coherent body, and
 e. heating said coherent body to a temperature between about 800° C and about 1200° C in a non-oxidizing environment.

10. The method set forth in claim 9 wherein said organic material is heated to a temperature between about 425° C and about 500° C and maintained at said temperature until the material changes from a liquid to a solid.

11. The method set forth in claim 9 wherein said organic material is heated no more than necessary to form an infusible residue.

12. The method set forth in claim 10 wherein said organic material is gradually heated to said temperature between about 425° C and about 500° C at a rate of about 10° to about 30° per hour.

13. The method set forth in claim 9 wherein the rate at which said coherent body is heated at temperatures above about 425° C is from about 3° C per hour to about 250° C per hour.

14. The method set forth in claim 9 wherein said substantially infusible plastic mass is comminuted by milling in a substantially non-oxidizing environment.

15. The method set forth in claim 9 wherein said substantially infusible plastic mass is particulated and mixed with a non-oxidizing liquid carrier and thereafter comminuted by milling the particles while immersed in said liquid carrier.

16. The method set forth in claim 9 wherein said substantially infusible plastic mass is comminuted until the average particle size is less than about ten microns in the largest dimension.

17. The method set forth in claim 9 wherein said particles are pressed into a coherent body by exerting isostatic pressure thereon in the range of about 5,000 to about 80,000 psi.

18. The process of making a homogeneous unitary body of graphite comprising the steps of:
 a. producing a substantially infusible plastic mass having a volatile content of from about 3% to about 11% by heating an organic material which passes through a liquid phase during pyrolysis in a non-oxidizing environment,
 b. discontinuing said heating while said mass remains plastic,
 c. comminuting said substantially infusible plastic mass into particles,
 d. pressing said particles into a coherent body, and
 e. heating said coherent body to a temperature of at least 1800° C in a non-oxidizing environment and until graphitization has occurred.

19. The process set forth in claim 18 wherein said organic material is heated from ambient temperature to a temperature between about 425° C and about 500° C at the rate of about 10° C per hour to about 30° C per hour and maintained at said temperature between about 425° C and about 500° C until said organic material is converted to a solid.

20. The process set forth in claim 18 wherein said organic material is heated no more than necessary to form an infusible residue.

21. The process set forth in claim 18 wherein the temperature of said body is increased at a rate of about ° C per hour to about 250° C per hour between the temperatures of about 400° C and about 800° C.

22. The process set forth in claim 21 wherein the temperature of said body is increased at a rate of about 50° C per hour to about 250° C per hour between the temperatures of about 800° C and about 1200° C.

23. The process set forth in claim 22 wherein said body is heated directly from about 1200° C to a temperature between about 2200° C and about 2500° C and maintained at said temperature between about 2200° C and about 2500° C for a time sufficient to permit the temperature of said body to reach equilibrium throughout said body.

24. The process set forth in claim 18 wherein said substantially infusible plastic mass is comminuted by milling in a liquid carrier and thereafter vaporizing the liquid carrier from said particles in a non-oxidizing environment.

25. The method of making a unitary, homogeneous body of graphite comprising the steps of:
 a. producing a substantially infusible plastic residue having a volatile 3% to about 11% by heating a graphitizable carbon source which passes through a liquid phase during pyrolysis in a substantially non-oxidizing environment.
 b. discontinuing said heating when the residue is substantially infusible and remains plastic,
 c. comminuting said substantially infusible plastic residue into particles,
 d. forming said particles into a coherent body, and
 e. heating said coherent body to a temperature of at least about 1800° C in a substantially non-oxidizing environment and until graphitization has occurred.

26. The method set forth in claim 25 wherein said residue is comminuted into particles having an average particle size less than about 10 microns in the largest dimension by milling in a substantially non-oxidizing environment.

27. The method set forth in claim 25 wherein said residue is comminuted into particles having an average particle size of about one to two microns in the largest diameter by ball milling in a liquid medium.

28. The method set forth in claim 25 wherein said graphitizable carbon source is heated no more than necessary to produce a truly infusible residue.

29. The method set forth in claim 25 wherein said particles are formed into a coherent body by placing said particles in a mold and exerting pressure on said particles in said mold in the range of about 5,000 to about 80,000 psi.

30. The process set forth in claim 18 wherein said substantially infusible plastic mass is comminuted to particles having a substantially uniform particle size of less than about 1,000 microns in the largest dimension.

31. A precursor for forming green bodies suitable for conversion to unitary bodies of carbon and made by heating an organic material which passes through a liquid phase during pyrolysis in a non-oxidizing environment until the liquid is converted to a substantially infusible plastic mass having a volatile content of from about 3% to about 11%, discontinuing the heating while said mass remains plastic, and comminuting said mass to form particles.

32. The precursor of claim 31, the particles having an average size less than about 1,000 microns in the largest dimension.

33. A green body suitable for conversion to carbon by heating in a substantially non-oxidizing environment comprising a unitary, homogeneous body consisting essentially of self-bonded particles made by heating an organic material which is converted from a liquid to a solid during pyrolysis until said material reaches the point where the material is plastic and where controlled heating of a body formed from particles thereof will not cause said particles to melt or said body to lose its structural integrity, discontinuing heating at a point at which said material remains plastic and has a volatile content of from about 3% to about 11%, and comminuting said material to form particles, the particles thus formed being pressed together into a coherent body.

34. The green body of claim 33, the said particles formed by comminuting having an average size of less than about 1,000 microns in the largest dimension.

* * * * *